US009554276B2

(12) United States Patent
Thirasuttakorn et al.

(10) Patent No.: US 9,554,276 B2
(45) Date of Patent: Jan. 24, 2017

(54) SYSTEM AND METHOD FOR ON THE FLY PROTOCOL CONVERSION IN OBTAINING POLICY ENFORCEMENT INFORMATION

(75) Inventors: Nat Thirasuttakorn, Seattle, WA (US); Jason Haworth, Lynnwood, WA (US); Brandon Burns, Leavenworth, KS (US); Ian Michael Smith, Middletown, NY (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/284,806

(22) Filed: Oct. 28, 2011

(65) Prior Publication Data

US 2012/0240184 A1 Sep. 20, 2012

Related U.S. Application Data

(60) Provisional application No. 61/408,557, filed on Oct. 29, 2010.

(51) Int. Cl.
*H04L 29/06* (2006.01)
*H04W 12/08* (2009.01)

(52) U.S. Cl.
CPC .............. *H04W 12/08* (2013.01); *H04L 63/10* (2013.01); *H04L 63/20* (2013.01)

(58) Field of Classification Search
CPC ...... H04W 12/02; H04W 12/06; H04W 12/08; H04W 80/04; H04W 76/02; H04W 4/18; H04W 88/16
See application file for complete search history.

(56) References Cited

U.S. PATENT DOCUMENTS 3,950,735 A 4/1976 Patel
4,644,532 A 2/1987 George et al.
(Continued)

FOREIGN PATENT DOCUMENTS

EP 0744850 A2 11/1996
WO WO 91/14326 9/1991
(Continued)

OTHER PUBLICATIONS

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.
(Continued)

*Primary Examiner* — David Garcia Cervetti
*Assistant Examiner* — Khoi Le
(74) *Attorney, Agent, or Firm* — LeClairRyan, a Professional Corporation (57) ABSTRACT

A system, machine readable medium and method for utilizing protocol conversions in policy changing enforcement is disclosed. A message, in a first protocol, is received from a network gateway device including identifying information unique to a client attempting to access a resource from a server. The message is processed using one or more portions of the client identifying information as a unique key identifier. A policy access request is generated, in a second protocol, and includes at least the unique key identifier. The policy access request is sent to a policy server, wherein the policy server is configured to provide policy enforcement information of the client associated with the policy access request. The policy enforcement information is received and one or more policies from the policy enforcement information are enforced to network traffic between the client and the server.

18 Claims, 3 Drawing Sheets

(56) References Cited

U.S. PATENT DOCUMENTS

| | | | |
|---|---|---|---|
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,167,024 | A | 11/1992 | Smith et al. |
| 5,299,312 | A | 3/1994 | Rocco, Jr. |
| 5,327,529 | A | 7/1994 | Fults et al. |
| 5,367,635 | A | 11/1994 | Bauer et al. |
| 5,371,852 | A | 12/1994 | Attanasio et al. |
| 5,406,502 | A | 4/1995 | Haramaty et al. |
| 5,475,857 | A | 12/1995 | Dally |
| 5,517,617 | A | 5/1996 | Sathaye et al. |
| 5,519,694 | A | 5/1996 | Brewer et al. |
| 5,519,778 | A | 5/1996 | Leighton et al. |
| 5,521,591 | A | 5/1996 | Arora et al. |
| 5,528,701 | A | 6/1996 | Aref |
| 5,581,764 | A | 12/1996 | Fitzgerald et al. |
| 5,596,742 | A | 1/1997 | Agarwal et al. |
| 5,606,665 | A | 2/1997 | Yang et al. |
| 5,611,049 | A | 3/1997 | Pitts |
| 5,663,018 | A | 9/1997 | Cummings et al. |
| 5,752,023 | A | 5/1998 | Choucri et al. |
| 5,761,484 | A | 6/1998 | Agarwal et al. |
| 5,768,423 | A | 6/1998 | Aref et al. |
| 5,774,660 | A | 6/1998 | Brendel et al. |
| 5,790,554 | A | 8/1998 | Pitcher et al. |
| 5,802,052 | A | 9/1998 | Venkataraman |
| 5,812,550 | A | 9/1998 | Sohn et al. |
| 5,825,772 | A | 10/1998 | Dobbins et al. |
| 5,832,283 | A | 11/1998 | Chou et al. |
| 5,875,296 | A | 2/1999 | Shi et al. |
| 5,892,914 | A | 4/1999 | Pitts |
| 5,892,932 | A | 4/1999 | Kim |
| 5,919,247 | A | 7/1999 | Van Hoff et al. |
| 5,936,939 | A | 8/1999 | Des Jardins et al. |
| 5,941,988 | A | 8/1999 | Bhagwat et al. |
| 5,946,690 | A | 8/1999 | Pitts |
| 5,949,885 | A | 9/1999 | Leighton |
| 5,951,694 | A | 9/1999 | Choquier et al. |
| 5,959,990 | A | 9/1999 | Frantz et al. |
| 5,974,460 | A | 10/1999 | Maddalozzo, Jr. et al. |
| 5,983,281 | A | 11/1999 | Ogle et al. |
| 5,988,847 | A | 11/1999 | McLaughlin et al. |
| 6,006,260 | A | 12/1999 | Barrick, Jr. et al. |
| 6,006,264 | A | 12/1999 | Colby et al. |
| 6,026,452 | A | 2/2000 | Pitts |
| 6,028,857 | A | 2/2000 | Poor |
| 6,051,169 | A | 4/2000 | Brown et al. |
| 6,078,956 | A | 6/2000 | Bryant et al. |
| 6,085,234 | A | 7/2000 | Pitts et al. |
| 6,092,196 | A | 7/2000 | Reiche |
| 6,108,703 | A | 8/2000 | Leighton et al. |
| 6,111,876 | A | 8/2000 | Frantz et al. |
| 6,128,279 | A | 10/2000 | O'Neil et al. |
| 6,128,657 | A | 10/2000 | Okanoya et al. |
| 6,160,874 | A | 12/2000 | Dickerman et al. |
| 6,170,022 | B1 | 1/2001 | Linville et al. |
| 6,178,423 | B1 | 1/2001 | Douceur et al. |
| 6,182,139 | B1 | 1/2001 | Brendel |
| 6,192,051 | B1 | 2/2001 | Lipman et al. |
| 6,233,612 | B1 | 5/2001 | Fruchtman et al. |
| 6,246,684 | B1 | 6/2001 | Chapman et al. |
| 6,253,226 | B1 | 6/2001 | Chidambaran et al. |
| 6,253,230 | B1 | 6/2001 | Couland et al. |
| 6,263,368 | B1 | 7/2001 | Martin |
| 6,289,012 | B1 | 9/2001 | Harrington et al. |
| 6,298,380 | B1 | 10/2001 | Coile et al. |
| 6,327,622 | B1 | 12/2001 | Jindal et al. |
| 6,343,324 | B1 | 1/2002 | Hubis et al. |
| 6,347,339 | B1 | 2/2002 | Morris et al. |
| 6,360,270 | B1 | 3/2002 | Cherkasova et al. |
| 6,374,300 | B2 | 4/2002 | Masters |
| 6,396,833 | B1 | 5/2002 | Zhang et al. |
| 6,430,562 | B1 | 8/2002 | Kardos et al. |
| 6,434,081 | B1 | 8/2002 | Johnson et al. |
| 6,480,476 | B1 | 11/2002 | Willars |
| 6,484,261 | B1 | 11/2002 | Wiegel |
| 6,490,624 | B1 | 12/2002 | Sampson et al. |
| 6,510,135 | B1 | 1/2003 | Almulhem et al. |
| 6,510,458 | B1 | 1/2003 | Berstis et al. |
| 6,519,643 | B1 | 2/2003 | Foulkes et al. |
| 6,601,084 | B1 | 7/2003 | Bhaskaran et al. |
| 6,636,503 | B1 | 10/2003 | Shiran et al. |
| 6,636,894 | B1 | 10/2003 | Short et al. |
| 6,650,640 | B1 | 11/2003 | Muller et al. |
| 6,650,641 | B1 | 11/2003 | Albert et al. |
| 6,654,701 | B2 | 11/2003 | Hatley |
| 6,661,802 | B1 | 12/2003 | Homberg et al. |
| 6,683,873 | B1 | 1/2004 | Kwok et al. |
| 6,691,165 | B1 | 2/2004 | Bruck et al. |
| 6,694,517 | B1 | 2/2004 | James et al. |
| 6,708,187 | B1 | 3/2004 | Shanumgam et al. |
| 6,718,380 | B1 | 4/2004 | Mohaban et al. |
| 6,742,045 | B1 | 5/2004 | Albert et al. |
| 6,751,663 | B1 | 6/2004 | Farrell et al. |
| 6,754,228 | B1 | 6/2004 | Ludwig |
| 6,760,775 | B1 | 7/2004 | Anerousis et al. |
| 6,772,219 | B1 | 8/2004 | Shobatake |
| 6,779,039 | B1 | 8/2004 | Bommareddy et al. |
| 6,781,986 | B1 | 8/2004 | Sabaa et al. |
| 6,798,777 | B1 | 9/2004 | Ferguson et al. |
| 6,804,542 | B1 | 10/2004 | Haartsen |
| 6,816,901 | B1 | 11/2004 | Sitaraman et al. |
| 6,816,977 | B2 | 11/2004 | Brakmo et al. |
| 6,829,238 | B2 | 12/2004 | Tokuyo et al. |
| 6,868,082 | B1 | 3/2005 | Allen, Jr. et al. |
| 6,876,629 | B2 | 4/2005 | Beshai et al. |
| 6,876,654 | B1 | 4/2005 | Hegde |
| 6,888,836 | B1 | 5/2005 | Cherkasova |
| 6,928,082 | B2 | 8/2005 | Liu et al. |
| 6,950,434 | B1 | 9/2005 | Viswanath et al. |
| 6,954,780 | B2 | 10/2005 | Susai et al. |
| 6,957,272 | B2 | 10/2005 | Tallegas et al. |
| 6,975,592 | B1 | 12/2005 | Seddigh et al. |
| 6,986,040 | B1 | 1/2006 | Kramer et al. |
| 6,987,763 | B2 | 1/2006 | Rochberger et al. |
| 7,007,092 | B2 | 2/2006 | Peiffer |
| 7,058,633 | B1 | 6/2006 | Gnagy et al. |
| 7,113,993 | B1 | 9/2006 | Cappiello et al. |
| 7,133,944 | B2 | 11/2006 | Song et al. |
| 7,139,792 | B1 | 11/2006 | Mishra et al. |
| 7,185,359 | B2 | 2/2007 | Schmidt et al. |
| 7,228,422 | B2 | 6/2007 | Morioka et al. |
| 7,287,082 | B1 | 10/2007 | O'Toole, Jr. |
| 7,295,827 | B2 | 11/2007 | Liu et al. |
| 7,308,703 | B2 | 12/2007 | Wright et al. |
| 7,308,709 | B1 | 12/2007 | Brezak et al. |
| 7,310,339 | B1 | 12/2007 | Powers et al. |
| 7,319,696 | B2 | 1/2008 | Inoue et al. |
| 7,321,926 | B1 | 1/2008 | Zhang et al. |
| 7,333,999 | B1 | 2/2008 | Njemanze |
| 7,343,413 | B2 | 3/2008 | Gilde et al. |
| 7,349,391 | B2 | 3/2008 | Ben-Dor et al. |
| 7,383,570 | B2 | 6/2008 | Pinkas et al. |
| 7,398,552 | B2 | 7/2008 | Pardee et al. |
| 7,433,962 | B2 | 10/2008 | Janssen et al. |
| 7,437,478 | B2 | 10/2008 | Yokota et al. |
| 7,454,480 | B2 | 11/2008 | Labio et al. |
| 7,490,162 | B1 | 2/2009 | Masters |
| 7,500,243 | B2 | 3/2009 | Huetsch et al. |
| 7,500,269 | B2 * | 3/2009 | Huotari ............... H04L 63/08 713/153 |
| 7,505,795 | B1 | 3/2009 | Lim et al. |
| 7,522,581 | B2 | 4/2009 | Acharya et al. |
| 7,526,541 | B2 | 4/2009 | Roese et al. |
| 7,558,197 | B1 | 7/2009 | Sindhu et al. |
| 7,580,971 | B1 | 8/2009 | Gollapudi et al. |
| 7,590,732 | B2 | 9/2009 | Rune |
| 7,624,424 | B2 | 11/2009 | Morita et al. |
| 7,644,137 | B2 | 1/2010 | Bozak et al. |
| 7,668,166 | B1 | 2/2010 | Rekhter et al. |
| 7,689,710 | B2 | 3/2010 | Tang et al. |
| 7,724,657 | B2 | 5/2010 | Rao et al. |
| 7,725,093 | B2 | 5/2010 | Sengupta et al. |

(56) References Cited

U.S. PATENT DOCUMENTS

| | | |
|---|---|---|
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,662 B2 | 11/2010 | Clark et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,103,781 B1 | 1/2012 | Wu et al. |
| 8,130,650 B2 | 3/2012 | Allen, Jr. et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 * | 11/2012 | Gai .................. H04L 41/00 370/217 |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,464,265 B2 | 6/2013 | Worley |
| 8,468,267 B2 | 6/2013 | Yigang et al. |
| 8,539,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,745,266 B2 | 6/2014 | Agarwal et al. |
| 8,788,665 B2 | 7/2014 | Gilde et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 9,037,166 B2 | 5/2015 | de Wit et al. |
| 9,077,554 B1 | 7/2015 | Szabo |
| 9,083,760 B1 | 7/2015 | Hughes et al. |
| 2001/0009554 A1 | 7/2001 | Katseff et al. |
| 2001/0023442 A1 | 9/2001 | Masters |
| 2002/0010783 A1 | 1/2002 | Primak et al. |
| 2002/0032777 A1 | 3/2002 | Kawata et al. |
| 2002/0049842 A1 | 4/2002 | Huetsch et al. |
| 2002/0059428 A1 | 5/2002 | Susai et al. |
| 2002/0083067 A1 | 6/2002 | Tamayo et al. |
| 2002/0112061 A1 | 8/2002 | Shih et al. |
| 2002/0138615 A1 | 9/2002 | Schmeling |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105983 A1 | 6/2003 | Brakmo et al. |
| 2003/0108052 A1 | 6/2003 | Inoue et al. |
| 2003/0128708 A1 | 7/2003 | Inoue et al. |
| 2003/0145062 A1 * | 7/2003 | Sharma ............ G06F 17/30905 709/217 |
| 2003/0145233 A1 | 7/2003 | Poletto et al. |
| 2003/0163576 A1 | 8/2003 | Janssen et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0151186 A1 | 8/2004 | Akama |
| 2004/0192312 A1 | 9/2004 | Li et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0122942 A1 * | 6/2005 | Rhee .................. H04W 28/08 370/338 |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0077902 A1 | 4/2006 | Kannan et al. |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 * | 7/2006 | Huotari .................. H04L 63/08 726/27 |
| 2006/0161577 A1 | 7/2006 | Kulkarni et al. |
| 2006/0171365 A1 | 8/2006 | Borella |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2007/0006293 A1 | 1/2007 | Balakrishnan et al. |
| 2007/0016662 A1 | 1/2007 | Desai et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0297410 A1 | 12/2007 | Yoon et al. |
| 2007/0297551 A1 | 12/2007 | Choi |
| 2008/0025297 A1 | 1/2008 | Kashyap |
| 2008/0034136 A1 * | 2/2008 | Ulenas .................. G06F 13/387 710/63 |
| 2008/0072303 A1 | 3/2008 | Syed |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0148340 A1 * | 6/2008 | Powell .................. H04L 63/105 726/1 |
| 2008/0159145 A1 | 7/2008 | Muthukrishnan et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0288661 A1 | 11/2008 | Galles |

(56) References Cited

U.S. PATENT DOCUMENTS

| | | | |
|---|---|---|---|
| 2008/0301760 A1* | 12/2008 | Lim | H04L 63/20 726/1 |
| 2009/0028337 A1 | 1/2009 | Balabine et al. | |
| 2009/0049230 A1 | 2/2009 | Pandya | |
| 2009/0070617 A1 | 3/2009 | Arimilli et al. | |
| 2009/0077619 A1 | 3/2009 | Boyce | |
| 2009/0094610 A1 | 4/2009 | Sukirya | |
| 2009/0119504 A1 | 5/2009 | van Os et al. | |
| 2009/0125496 A1 | 5/2009 | Wexler et al. | |
| 2009/0125532 A1 | 5/2009 | Wexler et al. | |
| 2009/0125625 A1 | 5/2009 | Shim et al. | |
| 2009/0138749 A1 | 5/2009 | Moll et al. | |
| 2009/0141891 A1 | 6/2009 | Boyen et al. | |
| 2009/0157678 A1 | 6/2009 | Turk | |
| 2009/0196282 A1 | 8/2009 | Fellman et al. | |
| 2009/0228956 A1* | 9/2009 | He | H04L 63/20 726/1 |
| 2009/0287935 A1 | 11/2009 | Aull et al. | |
| 2009/0296624 A1 | 12/2009 | Ryu et al. | |
| 2009/0300407 A1 | 12/2009 | Kamath et al. | |
| 2010/0011434 A1 | 1/2010 | Kay | |
| 2010/0017846 A1* | 1/2010 | Huang | H04L 12/14 726/1 |
| 2010/0023582 A1 | 1/2010 | Pedersen et al. | |
| 2010/0071048 A1 | 3/2010 | Novak et al. | |
| 2010/0115236 A1 | 5/2010 | Bataineh et al. | |
| 2010/0122091 A1 | 5/2010 | Huang et al. | |
| 2010/0150154 A1 | 6/2010 | Viger et al. | |
| 2010/0150169 A1 | 6/2010 | Brown | |
| 2010/0154031 A1 | 6/2010 | Montemurro et al. | |
| 2010/0165877 A1 | 7/2010 | Shukla et al. | |
| 2010/0189052 A1 | 7/2010 | Kavanagh et al. | |
| 2010/0242092 A1 | 9/2010 | Harris et al. | |
| 2010/0251330 A1* | 9/2010 | Kroeselberg | H04L 63/0884 726/3 |
| 2010/0279733 A1 | 11/2010 | Karsten et al. | |
| 2010/0322250 A1 | 12/2010 | Shetty et al. | |
| 2010/0325277 A1 | 12/2010 | Muthiah et al. | |
| 2011/0040889 A1 | 2/2011 | Garrett et al. | |
| 2011/0047620 A1 | 2/2011 | Mahaffey et al. | |
| 2011/0066718 A1 | 3/2011 | Susai et al. | |
| 2011/0153822 A1 | 6/2011 | Rajan et al. | |
| 2011/0154443 A1* | 6/2011 | Thakur | G06F 21/41 726/3 |
| 2011/0173295 A1 | 7/2011 | Bakke et al. | |
| 2011/0184733 A1 | 7/2011 | Yu et al. | |
| 2011/0246800 A1 | 10/2011 | Accpadi et al. | |
| 2011/0273984 A1 | 11/2011 | Hsu et al. | |
| 2011/0282997 A1 | 11/2011 | Prince et al. | |
| 2011/0321122 A1* | 12/2011 | Mwangi | G06F 21/6245 726/1 |
| 2012/0016994 A1 | 1/2012 | Nakamura et al. | |
| 2012/0039341 A1 | 2/2012 | Latif et al. | |
| 2012/0041965 A1 | 2/2012 | Vasquez et al. | |
| 2012/0063314 A1 | 3/2012 | Pignataro et al. | |
| 2012/0066489 A1 | 3/2012 | Ozaki et al. | |
| 2012/0191847 A1 | 7/2012 | Nas et al. | |
| 2012/0311153 A1 | 12/2012 | Morgan | |
| 2013/0029726 A1 | 1/2013 | Berionne et al. | |
| 2013/0091002 A1 | 4/2013 | Christie et al. | |
| 2013/0198322 A1 | 8/2013 | Oran et al. | |
| 2013/0336122 A1 | 12/2013 | Baruah et al. | |
| 2014/0025823 A1 | 1/2014 | Szabo et al. | |
| 2014/0040478 A1 | 2/2014 | Hsu et al. | |
| 2014/0095661 A1 | 4/2014 | Knowles et al. | |
| 2014/0269484 A1 | 9/2014 | Dankberg et al. | |
| 2014/0317404 A1 | 10/2014 | Carlson et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

PCT International Search Report and PCT/ISA/210 mailed May 30, 2012.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report and the Written Opinion, for International Patent Application No. PCT/US2013/026615, Date of Mailing: Jul. 4, 2013.

F5 Networks Inc., "Configuration Guide for Local Traffic Management," F5 Networks Inc., Jan. 2006, version 9.2.2, 406 pgs.

International Search Report and the Written Opinion, for International Patent Application No. PCT/US2011/058469, Date of Mailing: Oct. 3, 2015.

International Search Report and the Written Opinion, for International Patent Application No. PCT/US2011/058469, Date of Mailing: Mar. 10, 2015.

Extended European Search Report for Corresponding European Patent Application No. 13/284,806.

* cited by examiner

SYSTEM AND METHOD FOR ON THE FLY PROTOCOL CONVERSION IN OBTAINING POLICY ENFORCEMENT INFORMATION

STATEMENT OF RELATED APPLICATION

The present application claims the benefit of priority based on U.S. Provisional Patent Application Ser. No. 61/408,557, filed on Oct. 29, 2010, in the name of inventors Nat Thirasuttakorn, Jason Haworth, Brandon Burns and Ian Smith, entitled "On The Fly Protocol Conversion In Policy Charging Enforcement Function System and Method", all commonly owned herewith.

FIELD

This technology generally relates to network communication security, and more particularly, to a system and method for on-the-fly protocol conversion in obtaining policy charging enforcement information.

BACKGROUND

In existing systems, client devices, such as mobile devices, will attempt to access a service or resource from one or more servers via a cellular based network. During initiation of the connection, the client device will start a data context with a gateway node in which the gateway node will send an Authorization, Authentication and Accounting (AAA) message to a policy server in a cellular network based protocol. In the case that a virtual policy enforcement proxy device is positioned between the gateway node and the server, and the policy enforcement device must retrieve policy information of the client device from a policy server in which messages sent between the proxy device and policy server may be in a protocol different than the protocol of the AAA message. This can be costly and burdensome using current technologies.

What is needed is a network traffic management device which is able to utilize unique information of the user in generating a policy access request to a policy server, wherein the network traffic management device is able to apply policy enforcement functions from the policy server to the network traffic between the client device and the server(s).

SUMMARY

In an aspect, a method for utilizing protocol conversions in policy changing enforcement is disclosed. The method comprises receiving, at a network traffic management device, a message from a network gateway device including identifying information unique to a client attempting to make a request to access a resource from a server, the message being in a first protocol. The method comprises processing the message at the network traffic management device and using one or more portions of the client identifying information as a unique key identifier. The method comprises generating a policy access request to obtain policy enforcement information for the client, wherein the policy access request includes at least the unique key identifier and is in a second protocol different from the first protocol. The method comprises sending the policy access request to a policy server, wherein the policy server is configured to provide policy enforcement information of the client associated with the policy access request. The method comprises retrieving policy enforcement information for the client from the policy server. The method comprises enforcing one or more policies from the policy enforcement information to network traffic between the client and the server.

In an aspect, a non-transitory machine readable medium having stored thereon instructions for protocol conversions in policy changing enforcement is disclosed. The medium comprises machine executable code which when executed by at least one machine, causes the machine to receive a message from a network gateway device including identifying information unique to a client attempting to make a request to access a resource from a server, the message being in a first protocol. The machine is configured to processes the message using one or more portions of the client identifying information as a unique key identifier. The machine is configured to generate a policy access request to obtain policy enforcement information for the client, wherein the policy access request includes at least the unique key identifier and is in a second protocol different from the first protocol. The machine is configured to send the policy access request to a policy server, wherein the policy server is configured to provide policy enforcement information of the client associated with the policy access request. The machine is configured to retrieve policy enforcement information for the client from the policy server. The machine is configured to enforce one or more policies from the policy enforcement information to network traffic between the client and the server.

In an aspect, a network traffic management device for protocol conversions in policy changing enforcement is disclosed. The network traffic management device comprises a network interface that receives a request from the client device over a network, whereby the request is to access a resource from a server. The network traffic management device comprises a memory having stored thereon instructions for protocol conversions in policy changing enforcement. The network traffic management device comprises a processor coupled to the memory and the network interface. The processor is configured to execute instructions which causes the processor to receive a message from a network gateway device including identifying information unique to a client attempting to make a request to access a resource from a server, the message being in a first protocol. The processor is configured to processes the message using one or more portions of the client identifying information as a unique key identifier. The processor is configured to generate a policy access request to obtain policy enforcement information for the client, wherein the policy access request includes at least the unique key identifier and is in a second protocol different from the first protocol. The processor is configured to send the policy access request to a policy server, wherein the policy server is configured to provide policy enforcement information of the client associated with the policy access request. The processor is configured to retrieve policy enforcement information for the client from the policy server. The processor is configured to enforce one or more policies from the policy enforcement information to network traffic between the client and the server.

In one or more of the above claimed aspects, the policy enforcement information along with the associated unique key information of the user is stored in memory. In one or more of the above claimed aspects, the client communicates with the gateway device via a cellular network and the first protocol is a RADIUS protocol or a DIAMETER protocol.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

In general, a system, machine readable medium and method for utilizing protocol conversions in policy changing enforcement is disclosed. A client request is received at a gateway node, such as a Gateway GPRS Support Node (GGSN), to establish a data context. The GGSN performs AAA functions and transmits the AAA message in a protocol such a RADIUS, DIAMETER and the like. The AAA message will contain unique identification information of the client. The received AAA message is processed by an access module 210 of a network traffic management device and one or more of the unique client identification information is used by the access module 210 as a unique key identifier associated with the client identifying information. A policy access request is generated by the access module 210 to obtain policy enforcement information for the user, wherein the policy access request includes at least the unique key identifier and is in another protocol, such as TCP. The policy access request, such as an LDAP search request, is sent from the network traffic management device to a policy server, wherein the policy server utilizes the unique key identifier in the policy access request to look up policy enforcement information of the client. The policy enforcement information for the client is sent from the policy server to the network traffic management device, wherein the network traffic management device is able to use the received client policy information to enforced traffic between the client and the server.

Figure 1:
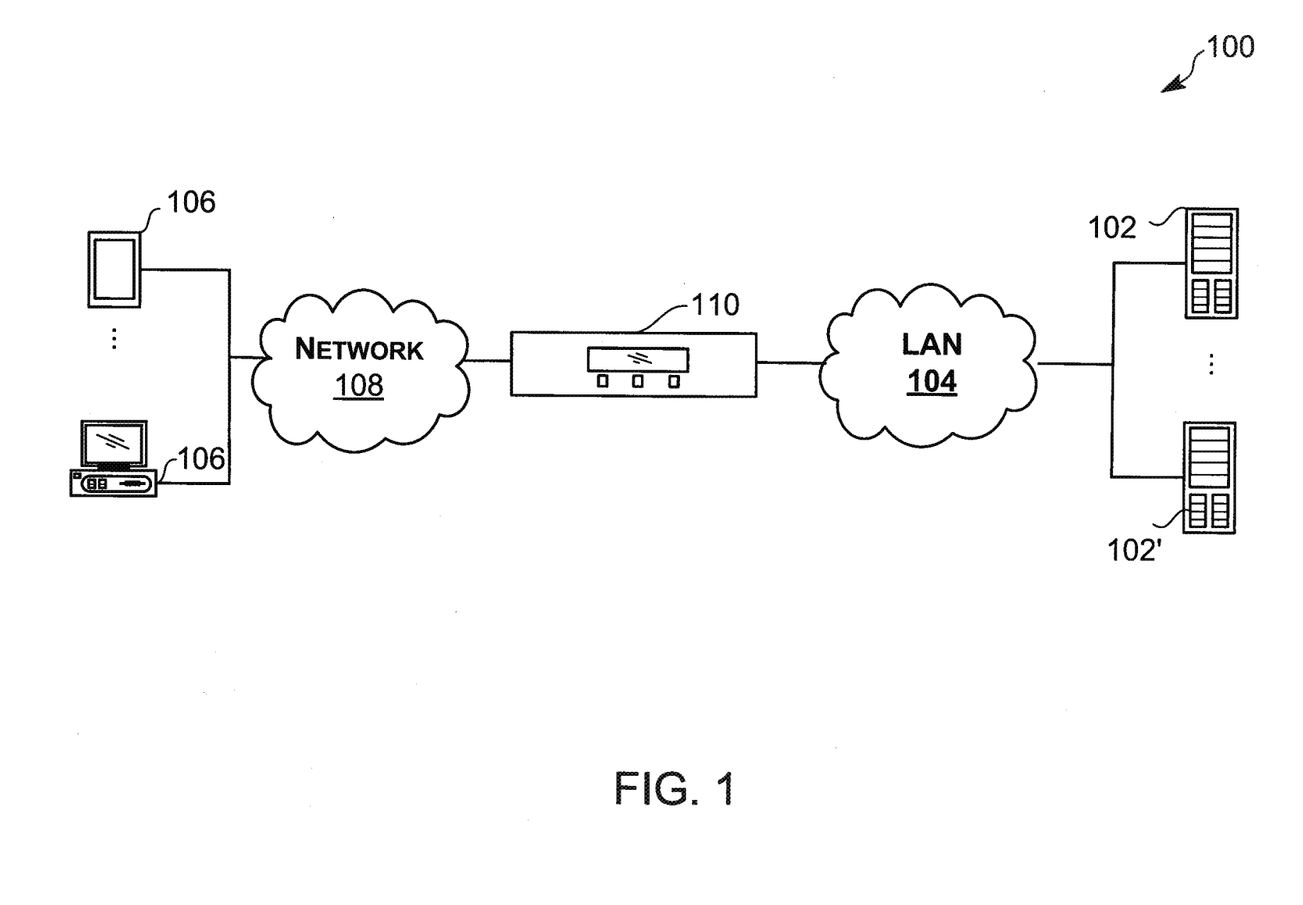
FIG. 1 is a diagram of an example system environment that includes a network traffic management device.

FIG. 1 is a diagram of an example system environment that includes a network traffic management device in accordance with an aspect of the present disclosure. The example system environment 100 includes one or more Web and/or non Web application servers 102 (referred generally as "servers"), one or more policy servers 102', one or more client devices 106 and one or more network traffic management devices 110, although the environment 100 could include other numbers and types of devices in other arrangements. The network traffic management device 110 is coupled to the servers 102, 102' via local area network (LAN) 104 and client devices 106 via a wide area network 108. Generally, client device requests are sent over the network 108 which are received or intercepted by the network traffic management device 110.

Client devices 106 comprise network computing devices capable of connecting to other network computing devices, such as network traffic management devices 110 and/or servers 102. Such connections are performed over wired and/or wireless networks, such as network 108, to send and receive data, such as for Web-based requests, receiving server responses to requests and/or performing other tasks. In a particular aspect, the client device 106 is a mobile phone, smartphone and/or tablet device which is connected to a cellular network within network 108 which allows communications with the servers 102 via the network traffic management device 110. Other non-limiting and non-exhausting examples of client devices 106 include personal computers (e.g., desktops, laptops), smart televisions, video game devices, and the like. In an example, client devices 106 can run one or more Web browsers that provide an interface for operators, such as human users, to interact with for making requests for resources to different web server-based applications and/or Web pages via the network 108, although other server resources may be requested by client devices. One or more Web-based applications may run on one or more of the servers 102 that provide the requested data back as one or more server responses to the client device 106 via the network traffic management device 110.

The servers 102 comprise one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. One or more of the policy servers 102' provide policy enforcement information for the particular user making the request. It should be noted that while only two servers 102 are shown in the environment 100 depicted in FIG. 1, other numbers and types of servers may be utilized in the environment 100. It is also contemplated that one or more of the servers 102, 102' may comprise a cluster of servers managed by one or more network traffic management devices 110. In one or more aspects, the servers 102, 102' may be configured implement to execute any version of Microsoft® IIS server, and/or Apache® server, although other types of servers may be used. Further, additional servers may be coupled to the network 108 and many different types of applications may be available on servers 102, 102'.

Network 108 comprises a publicly accessible network, such as the Internet, which is connected to client devices 106. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, cell towers and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

The network 108 may include a GPRS cellular network, such as a GSM (e.g. 2G, 3G, 4G) or WCDMA network which contains Gateway GPRS Support Nodes (GGSN) and the like. The GGSN perform AAA functions when data context connections are set up between a particular client and the GGSN. The GGSN, once verifying the client, transmits a message toward the servers 102 which contains information uniquely identifying the requesting client. In an aspect, the message transmitted from the GGSN is in RADIUS, DIAMETER or another like protocol. In essence, the network 108 includes any communication medium by which data may travel between client devices 106, servers 102, network traffic management devices 110, and the like.

LAN 104 comprises a private local area network that allows communications between the one or more network traffic management devices 110 and one or more servers 102, 102' in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As per the network protocols, requests from the requesting client devices 106 may be sent and received as one or more streams of data packets over network 108 using protocols such as TCP/IP, RADIUS, DIAMETER and the like. Such protocols can be utilized by the client devices 106, network traffic management device 110 and the access and web servers 102, to establish connections, send and receive data for existing connections, perform AAA transactions (e.g. GGSN) and policy enforcement functions and the like. It is to be understood that the one or more servers 102 may be hardware and/or software, and/or may represent a system with multiple servers that may include internal or external networks.

As shown in the example environment 100 depicted in FIG. 1, the network traffic management device 110 is interposed between client devices 106 with which it communicates with client devices 106 via network 108 and servers 102, 102' (in a secured or non-secured network) via LAN 104. The network traffic management device 110 may manage the network communications by performing several network traffic related functions involving the communications. As will be discussed in more detail below, the network traffic management device 110 is able utilize client identifying information from an AAA message sent from a GGSN as a unique key identifier that is used in a policy access request that is in another protocol from the protocol which the AAA message was received in. Some other functions include, but are not limited to, load balancing, access control, and validating HTTP requests using JavaScript code that are sent back to requesting client devices 106.

Although examples of the server 102, the network traffic management device 110, and the client devices 106 are described and illustrated herein, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s). In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices of the system 100.

Figure 2:
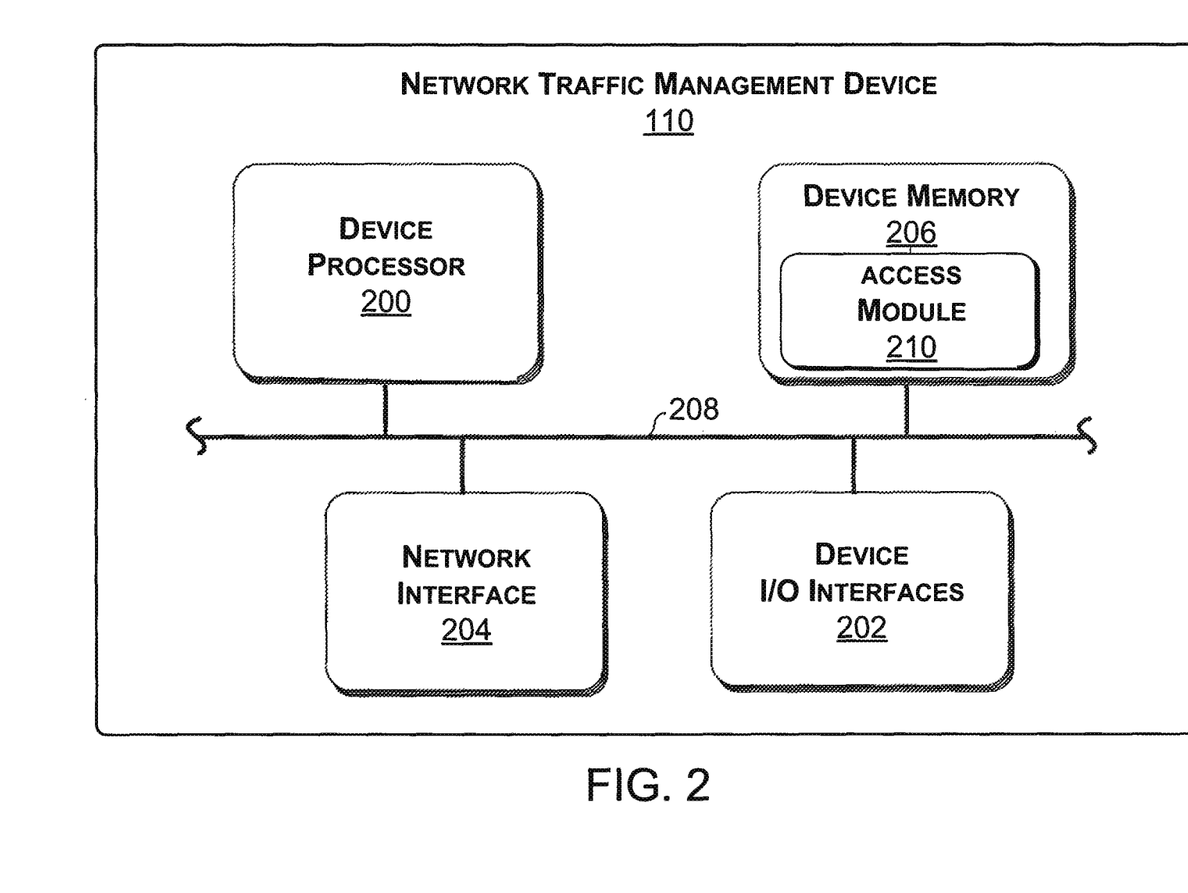
FIG. 2 is a block diagram of the network traffic management device shown in FIG. 1.

FIG. 2 is a block diagram of the network traffic management device shown in FIG. 1 in accordance with an aspect of the present disclosure. As shown in FIG. 2, an example network traffic management device 110 includes one or more device processors 200, one or more device I/O interfaces 202, one or more network interfaces 204, and one or more device memories 206 which are coupled together by bus 208. In an aspect, the network traffic management device 110 includes one or more access modules 210 that can be within or outside the device memory 206. It should be noted that the network traffic management device 110 can be configured to include other types and/or numbers of components and is thus not limited to the configuration shown in FIG. 2.

Device processor 200 of the network traffic management device 110 comprises one or more microprocessors configured to execute non-transitory computer/machine readable and executable instructions stored in the device memory 206. Such instructions, when executed by one or more processors 200 of the network traffic management device 110 cause the access module 110 to implement general functions and specific functions related to the process described below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 202 comprise one or more user input and output device interface mechanisms. The interface may include a computer keyboard, mouse, touchscreen, display device, and the corresponding physical ports and underlying supporting hardware and software to enable the network traffic management device 110 to communicate with other network devices in the environment 100. Such communications may include accepting user data input and providing user output, although other types and numbers of user input and output devices may be used. Additionally or alternatively, as will be described in connection with network interface 204 below, the network traffic management device 110 may communicate with the outside environment for certain types of operations (e.g., configuration) via one or more network management ports.

Network interface 204 comprises one or more mechanisms that enable the network traffic management device 110 to engage in network communications over the LAN 104 and the network 108 using one or more of a number of protocols, such as TCP/IP, HTTP, UDP, RADIUS, DIAMETER, DNS and the like. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102, 102'. Moreover, the interface 204 may include certain physical ports dedicated to receiving and/or transmitting certain types of network data, such as device management related data for configuring the network traffic management device 110 or client request/server response related data.

Bus 208 may comprise one or more internal device component communication buses, links, bridges and supporting components, such as bus controllers and/or arbiters. The bus 208 enables the various components of the network traffic management device 110, such as the processor 200, device I/O interfaces 202, network interface 204, and memory 206 to communicate data. However, it is contemplated that the bus 208 may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 206 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200 to perform general and specific functions. In particular, such instructions cause the processor 200 to perform actions, including perform one or more portions of the process discussed below. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by the network traffic management device 110.

The access module 210 is configured to retrieve and apply policy enforcement functions for a particular user when the protocols between the received GGSN's AAA message and a policy access request are different from one another. As stated above, an AAA message is received at the network traffic management device from a cellular base GGSN, wherein the AAA message contains unique client identifying information. The received AAA message is in a first protocol, such as RADIUS, DIAMETER or the like. The access module 210 extracts one or more of the client identifying information as a unique key identifier, whereby the unique key identifier is used in a policy access request for the client. The policy access request is generated to obtain policy enforcement information for the user, wherein the policy access request is in a second protocol, such as TCP. The policy access request is sent from the network traffic management device to a policy server, wherein the policy server utilizes the unique key identifier to look up policy enforcement information of the client. The policy enforcement information for the client is received from the policy server and enforced at network traffic between the client and the server.

Figure 3:
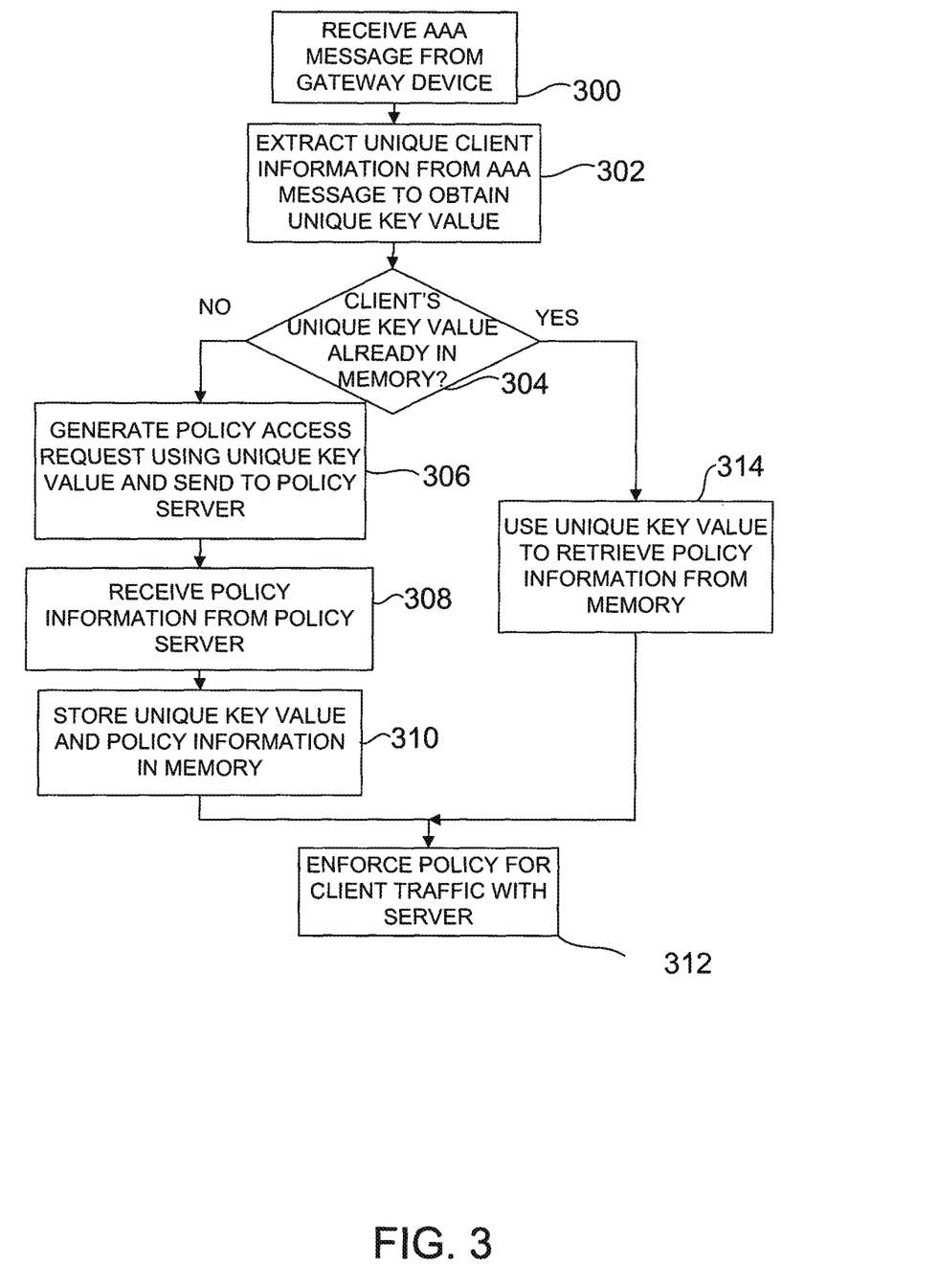
FIG. 3 is an example flow chart diagram depicting portions of processes in accordance with the present disclosure.

FIG. 3 illustrates an example flow chart in accordance with the process described in accordance with the present disclosure. In the example, a client device 106 sends a client request via the network 108 to access a network resource from one or more servers 102. In an aspect, the client device 106 is a mobile device (e.g. phone, tablet) that is capable of sending and receiving data at least partially over a GPRS cellular network, such as a GSM (e.g. 2G, 3G, 4G) or WCDMA within network 108.

When setting up a connection, the client device sends a request to a GGSN, or other network gateway device which performs AAA functions, to start a data context. During activation process (or shortly thereafter), the GGSN forwards an AAA message to the network traffic management device 110 using a cellular based protocol, such as RADIUS, DIAMETER and the like. As stated above, the AAA message includes information unique to that particular client, such as the client's IP address, Access Point Name (APN), MS-ISDN, the client device's phone number and the like The access module 210 of the network traffic management device 110 receives the AAA message from the gateway device (Block 300). The access module 210 processes the received message and extracts one or more portions of the client's unique information from the GGSN's message as a unique key address for the client (Block 302). In an aspect, the unique key address may include the client device's MS-ISDN, the source IP-address of the device 106, the APN and/or the like.

As shown in FIG. 3, the access module 210 inquires whether the identified unique key value had previously been processed and thus stored in one or more databases (Block 304). If the access module 210 determines whether policy information for the client is stored in the device 110. The determination can be made by identifying whether the unique key value is stored in one or more databases. If the policy information (or unique key value) not stored in the one or more databases, the access module 210 will then, on the fly, generate a policy access request and insert one or more unique key values, associated with the extracted unique client identifying information and insert it into the policy access request (Block 306).

The policy access request is sent as data packets in the TCP/IP protocol, which is different than the protocol in which the AAA message was received, from the network traffic management device 110 to one or more policy servers 102' and/or databases which contain policy enforcement parameters for user accessible services (Block 306). In an aspect, the policy access request may be a LDAP search request which is sent from the network traffic management device 110 to one or more LDAP configured policy servers 102' (LDAP server).

The policy server 102' receives the policy search request and uses the unique key value to look up policy enforcement information of the particular client in a memory. The policy server 102 responds asynchronously to the policy search request and provides with a policy search result which includes policy enforcement information of that particular client with respect to the received AAA message. This policy enforcement information is received at the network traffic management device 110 (Block 308). In an aspect, the policy search result also includes the unique search key previously sent by the access module 210 to ensure that the access module 210 is able to correctly identify the client to which the policy information is to be enforced. Upon the access module 210 receiving in the policy search result, the access module 210 stores the policy information along with the unique key value in the memory 206 (Block 310). By having the policy enforcement information for the user, the network traffic management device 110 is able to enforce policy functions on any services requests from the client to the server(s) 102 (Block 312).

In the above example aspect involving the client request being in the DIAMETER protocol, the policy server 102' asynchronously sends the policy access response (with accompanying policy enforcement information) back to the network traffic management device 110 along with a Capabilities Exchange Answer (CEA), whereby the CEA corresponds to the CER.

Referring back to Block 304, if the access module 210 determines that the client's unique key value is already stored in the memory 206, the access module 210 will use the unique key value to retrieve the policy enforcement information for the client from memory 206 (Block 314). The access module 210 will then be able to enforce the policy parameters retrieved from the memory 206 and apply the policy parameters to transactions between the client and the appropriate servers 102 (Block 312).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for utilizing protocol conversions in policy changing enforcement, the method comprising:
   receiving, by a network traffic management device, a message in a first protocol from a network gateway device comprising identifying information unique to a client device attempting to make a request to access a resource from a server, wherein the first protocol is an authentication, authorization, and accounting protocol;
   processing, by the network traffic management device, the received message, to extract one or more portions of the client device identifying information comprising one or more of a mobile station international subscriber directory number (MSIDN) of the client device, a source IP address of the client device, or an access point name (APN) of the client device for use as a unique key identifier;
   determining, by the network traffic management device, when the extracted unique key identifier is present within one or more databases; and
   generating, by the network traffic management device, a policy access request to obtain policy enforcement information for the client device when the extracted unique key identifier is absent within the one or more databases, wherein the generated policy access request includes at least the unique key identifier and is in a second protocol different from the first protocol, and wherein the second protocol is a TCP/IP protocol.

2. The method of claim 1, further comprising:
   storing, by the network traffic management device, the policy enforcement information and associated unique key information of the client device in a memory.

3. The method of claim 1, wherein the client device communicates with the gateway device via a cellular network and the first protocol is a RADIUS protocol.

4. The method of claim 1, wherein the client device communicates with the gateway device via a cellular network and the first protocol is a DIAMETER protocol.

5. The method of claim 1, wherein the policy request is a LDAP search request.

6. A non-transitory computer readable medium having stored thereon instructions for protocol conversions in policy changing enforcement, comprising computer executable code which when executed by at least one processor, causes the processor to perform steps to:
   receive a message in a first protocol from a network gateway device comprising identifying information unique to a client device attempting to make a request to access a resource from a server, wherein the first protocol is an authentication, authorization, and accounting protocol;
   process the received message to extract one or more portions of the client device identifying information comprising one or more of a mobile station international subscriber directory number (MSIDN) of the client device, a source IP address of the client device, or an access point name (APN) of the client device for use as a unique key identifier;
   determine when the extracted unique key identifier is present within one or more databases; and
   generate a policy access request to obtain policy enforcement information for the client device when the extracted unique key identifier is absent within the one or more databases, wherein the generated policy access request includes at least the unique key identifier and is in a second protocol different from the first protocol, and wherein the second protocol is a TCP/IP protocol.

7. The medium of claim 6, further comprises:
   store the policy enforcement information and associated unique key information of the client device in a memory.

8. The medium of claim 6, wherein the client device communicates with the gateway device via a cellular network and the first protocol is a RADIUS protocol.

9. The medium of claim 6, wherein the client device communicates with the gateway device via a cellular network and the first protocol is a DIAMETER protocol.

10. The medium of claim 6, wherein the policy access request is a LDAP search request.

11. A network traffic management device comprising:
    a network interface coupled to a client device via a network, the network interface receiving a request from the client device requesting access to the server, wherein the network traffic management device is interposed between and separate from the client device and the server;
    one or more processors;
    memory, wherein the memory is coupled to the one or more processors which are configured to execute programmed instructions stored in the memory which cause the processor to:
    receive a message in a first protocol from a network gateway device comprising identifying information unique to a client device attempting to make a request to access a resource from a server, wherein the first protocol is an authentication, authorization, and accounting protocol;
    process the received message to extract one or more portions of the client device identifying information comprising one or more of a mobile station international subscriber directory number (MSIDN) of the client device, a source IP address of the client device, or an access point name (APN) of the client device for use as a unique key identifier;

determine when the extracted unique key identifier is present within one or more databases; and generate a policy access request to obtain policy enforcement information for the client device when the extracted unique key identifier is absent within the one or more databases, wherein the generated policy access request includes at least the unique key identifier and is in a second protocol different from the first protocol, and wherein the second protocol is a TCP/IP protocol.

12. The network traffic management device of claim 11, wherein the processor is further configured to execute programmed instructions stored in the memory further comprising:

storing the policy enforcement information and associated unique key information of the client device in the memory.

13. The network traffic management device of claim 11, wherein the client device communicates with the gateway device via a cellular network and the first protocol is a RADIUS protocol.

14. The network traffic management device of claim 11, wherein the client device communicates with the gateway device via a cellular network and the first protocol is a DIAMETER protocol.

15. The network traffic management device of claim 11, wherein the policy access request is a LDAP search request.

16. The method as set forth in claim 1 further comprising:

sending, by the network traffic management device, the policy access request to a policy server, wherein the policy server is configured to provide policy enforcement information of the client device associated with the policy access request;

retrieving, by the network traffic management device, policy enforcement information for the client device from the policy server; and enforcing, by the network traffic management device, one or more policies from the policy enforcement information to network traffic between the client device and the server.

17. The medium as set forth in claim 6 further comprising:

sending the policy access request to a policy server, wherein the policy server is configured to provide policy enforcement information of the client device associated with the policy access request;

retrieving the policy enforcement information for the client device from the policy server; and enforcing one or more policies from the policy enforcement information to network traffic between the client device and the server.

18. The device as set forth in claim 11 wherein the processor is further configured to execute programmed instructions stored in the memory further comprising:

send the policy access request to a policy server, wherein the policy server is configured to provide policy enforcement information of the client device associated with the policy access request;

retrieve policy enforcement information for the client device from the policy server; and enforce one or more policies from the policy enforcement information to network traffic between the client device and the server.

* * * * *